US010681177B2

(12) United States Patent
Tarasenko et al.

(10) Patent No.: US 10,681,177 B2
(45) Date of Patent: Jun. 9, 2020

(54) SELF-DRIVING CONTENT DISTRIBUTION

(71) Applicants: Igor Tarasenko, San Francisco, CA (US); Grigori Dzekon, San Francisco, CA (US); Maxim Mitrofanov, Kiev (UA); Vitalii Shpak, Kiev (UA)

(72) Inventors: Igor Tarasenko, San Francisco, CA (US); Grigori Dzekon, San Francisco, CA (US); Maxim Mitrofanov, Kiev (UA); Vitalii Shpak, Kiev (UA)

( * ) Notice: Subject to any disclaimer, the term of this patent is extended or adjusted under 35 U.S.C. 154(b) by 215 days.

(21) Appl. No.: 15/489,925

(22) Filed: Apr. 18, 2017

(65) Prior Publication Data
US 2018/0302496 A1 Oct. 18, 2018

(51) Int. Cl.
*H04L 29/08* (2006.01)
*H04L 12/24* (2006.01)
*H04L 29/06* (2006.01)

(52) U.S. Cl.
CPC .......... *H04L 67/34* (2013.01); *H04L 41/0843* (2013.01); *H04L 41/5019* (2013.01); *H04L 67/10* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 8,824,274 B1* | 9/2014 | Medved | ................ | H04L 41/12 370/217 |
| 9,112,708 B1* | 8/2015 | Arad | ...................... | H04L 12/18 |
| 2014/0129700 A1* | 5/2014 | Mehta | ................ | H04L 43/0817 709/224 |
| 2016/0036839 A1* | 2/2016 | Shimizu | .............. | H04L 63/1416 726/23 |
| 2016/0062746 A1* | 3/2016 | Chiosi | ...................... | G06F 8/35 717/104 |
| 2016/0142285 A1* | 5/2016 | Lee | ......................... | H04L 69/22 370/392 |
| 2017/0104651 A1* | 4/2017 | Kakadia | .............. | H04L 12/2854 |
| 2018/0026987 A1* | 1/2018 | Jayawardena | ........ | H04L 63/102 726/7 |

* cited by examiner

*Primary Examiner* — Aaron N Strange
*Assistant Examiner* — Mohammad Yousuf A. Mian
(74) *Attorney, Agent, or Firm* — Steven A. Nielsen; www.NielsenPatents.com

(57) ABSTRACT

A platform provides a novel mechanism of implementation and operation for network functions such as switching, routing, firewalling, load balancing, isolation, etc. In the prior art, all the network functions are defined and instantiated within the software- or hardware-based network appliances. In the present invention, all the network appliances execute only the content delivery instructions received from business applications. Virtual service templates are used by application developers to describe different sets of application communication roles. The new platform includes a controller that stores those templates, authorizes interactions between platform components, collects information about the running state of platform components, and assists applications with the use of the platform. In accordance with the role assignments, each application may request role-specific configuration from the controller, use it to generate content delivery instructions, and send data alongside with the instructions, in the form of a special packet, into the network.

2 Claims, 9 Drawing Sheets

SELF-DRIVING CONTENT DISTRIBUTION

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to communication networks. More particularly, disclosed embodiments comprise means, methods and systems for designing application communication roles, retrieving role-specific configuration and generating corresponded content delivery instructions by applications, sending and receiving data accompanied by delivery instructions by applications, performing network functions upon all packets via content delivery instructions execution by general-purpose network appliances.

(2) Description of the Related Art

There are many shortfalls in the prior art, thus, ongoing fundamental transformations in how applications are developed, deployed and operated have imposed significant pressure on datacenter network architecture and network services in general.

In the prior art, massive and rigid creations occupied mainframes and multi-processor servers in the data center's environment with practically static network configuration. Now, those colossuses are superseded by millions of small software instances—each housed inside of a tiny physical server, virtual machine or container. All these software instances are, for the most part, network addressable entities that live in the data center's environment and require ever changing many-to-many connections to exchange data among themselves. The demand for instant and dynamic connectivity among millions of software instances has already created substantial and distinct problems for datacenters, cloud and network operators. Required network services are no longer subject to traditional provisioning and support. Instant activation and removal of a myriad of software instances (that are driven by different events from both inside and outside of the network domain) necessitate instant activation and removal of a myriad network connections between them. Moreover, requirements on all such connections are not identical. Based on its packet loss and delay tolerances, acceptable level of overhead, cost expectations, etc., every software instance might want to use unique one or several pathways across the datacenter network. The emergence of such requirements might be triggered by many reasons, among which are the type of application network load, the necessity to coordinate data distribution among parallel and concurrent application instances, the desire to achieve certain system reliability in the presence of faulty processes and resource limitations.

The prior art, aimed to solve the aforementioned problem, is mostly premised and entirely isolated in either the application or networking domain. In the application domain, many architectural approaches have been proposed to solve only some parts of the problem by introducing various intermediate pieces of software such as distributed caches, coordinators, locks, brokers, buses, etc. In the networking domain, all the efforts to find a solution for the problem have not yet provided key improvements but rather have added new layers of complexity such as new network routing or management protocols, moving network functions logic implementation back and forth between software and hardware. Attempts to create an interface between applications and networks in order to define network forwarding behavior by end-user applications have not yet produce any practical results.

At the same time, the problem, by and large, derives from the fact that the realm of application development, deployment and operations is entirely disconnected from the network domain. Instead of defining network services, applications are subjected to network services that are provided by network equipment vendors and infrastructure operators, that are devoid of flexibility to comport with application specific network needs. Thus, there is a need in the art that removes this fundamental disconnection.

BRIEF SUMMARY OF THE INVENTION

The present invention overcomes shortfalls in the art by introducing a new concept and paradigm of application-to-network interaction that transfers all the power and tools for defining, constructing and maintaining network services from the network equipment vendors and infrastructure operators to application developers. Instead of using an approach where a controller must program behavior of network switches on application requests in order to implement a service-specific communication technique, as the prior art does, the invention utilizes the methods of packet delivery based upon embedded instructions, wherein a network switch executes instructions receiving them directly from an application. To assist applications with the use of a network in the most flexible and effective way and, at the same time, to maintain a very high level of security, the presented network controller is used in a completely different manner as compared to the prior art. Controller stores a variety of templates for different sets of application communication roles; manages domains as well as host and switch accounts; authorizes establishment of connections between hosts and switches; instantiates virtual services within domains; provides hosts with credentials allowing the running applications to act in a certain role(s) within a particular instance of the network virtual service; assists applications with configuration of communication endpoints for each role. At the same time, in the present invention, a controller has no power to program forwarding behavior of network switches. Only applications define how data is directed and processed in the network.

Disclosed embodiments overcome shortfalls in the prior art by the magnitude of network service automation, personalization and security. By use of the disclosed embodiments, no network configuration is needed after attaching or disconnecting a host to/from the network. No network configuration is needed to instantiate a new network service. A huge variety of network virtual services with very different communication logics can peacefully coexist in complete isolation in the network. Any communication patterns—one-to-one, many-to-one, one-to-many, many-to-many—may be reproduced in the network. No intermediate servers are needed to facilitate network communications across the applications. Moreover, a network might serve not only as a plain data forwarding environment but also as a data processing environment as well. Data packets may be temporarily stored or modified en route from sender(s) to receiver(s). Thus higher resource utilization, better reliability, and new efficiencies are achieved by use of the disclosed embodiments.

Disclosed embodiments are sometimes referred to as self-driving content distribution (SDCD) platform.

Disclosed embodiments include:

1. A special-format packet comprising content delivery instructions and data payload.
2. A SDCD Controller storing templates with sets of communication rules, providing identity service, authorizing interactions between platform components, collecting information about the running status of platform components, assisting applications with the use of the platform.
3. A SDCD Switch executing content delivery instructions and relaying packets in accordance with the instruction execution outcome.
4. A SDCD Host providing an execution environment for SDCD-capable applications and facilitating their interactions with the network.
5. A SDCD-capable application that produces and consumes special packet payloads.
6. A data connection linking SDCD switches and SDCD hosts.
7. A control connection linking SDCD controller with SDCD switches and SDCD hosts.

REFERENCE NUMERALS IN THE DRAWINGS

Figure 1:
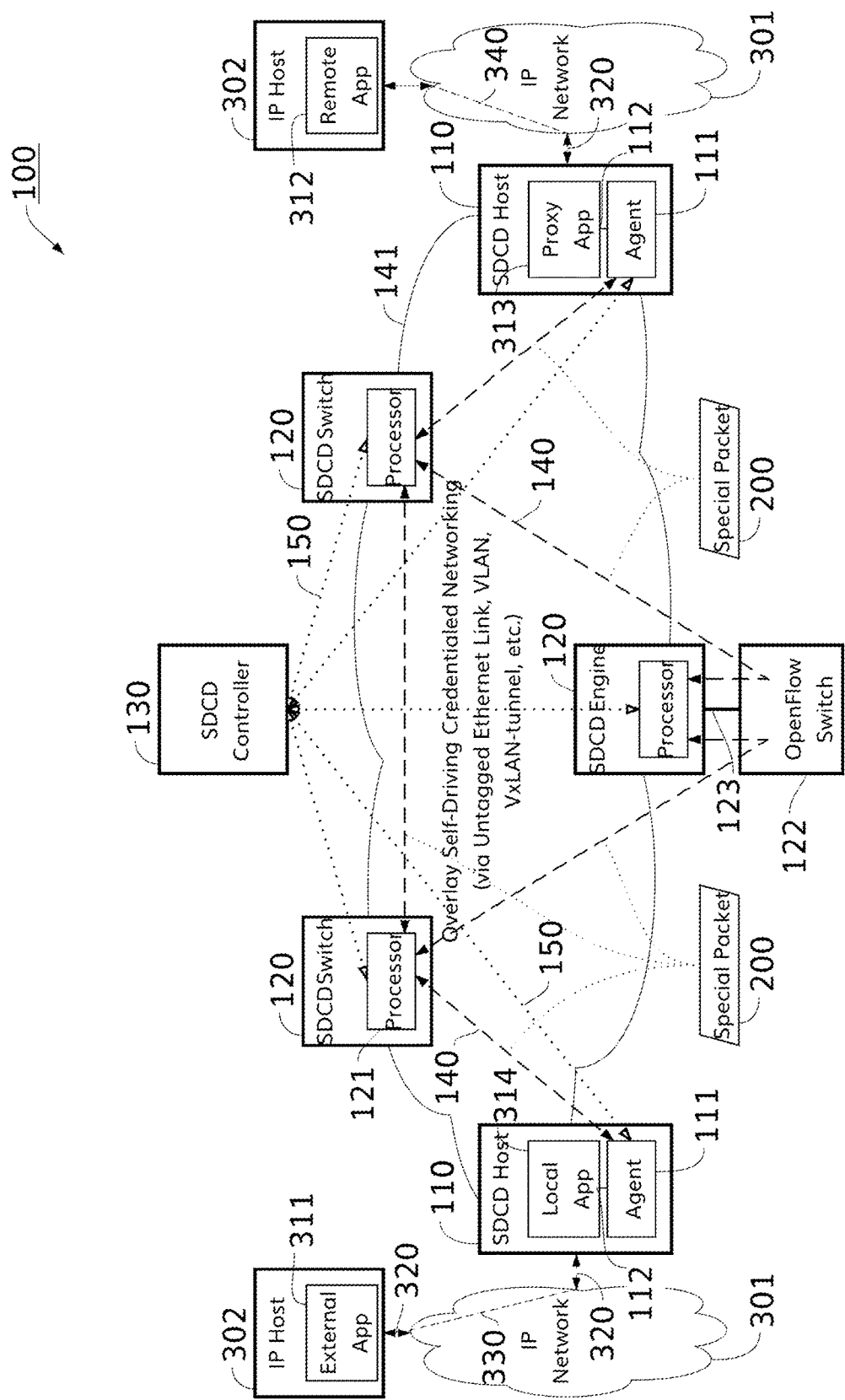
FIG. 1 is a schematic view of interactions between disclosed elements

100 Self-driving content distribution (SDCD) platform
110 SDCD-capable host
111 Special packet processing agent of SDCD-capable host 110
112 Interface between agent 111 and SDCD-capable application 313-314 running on the host 110
120 SDCD-capable switch or, sometimes called, engine
121 Special packet processor of SDCD-capable switch 120
122 Open Flow switch interconnected with SDCD engine 120
123 Interconnection between SDCD Engine and Open-Flow Switch
130 Controller of self-driving content distribution platform
140 Connection either between two switches 120 or between switch 120 and host 110
141 Overlay self-driving credentialed networking via untagged Ethernet links, VLANs, VxLAN-tunnels
150 Connection between controller 130 and either switch 120 or host 110
200 Special packet
200A One of the several disclosed special packet 200 structures
210 Header of the special packet 200A
211 Ethernet header of the special packet 200A
212 IPv6 header of the special packet 200A
213 UDP header of the special packet 200A
220 Payload of the special packet 200A
221 Authentication tag of the special packet payload 220
222 SUP-like chunk of the special packet payload 220
222A CONTROL, AUTH, PATH, INSTRUCTION, PRG_DATA chunk structure
222B PLD_DATA chunk structure
230 Trailer of the special packet 200A
240 Chunk header structure
241 Chunk Type field of the chunk header 240
242 Chunk Flags field of the chunk header 240
243 Chunk Length field of the chunk header 240
244 Transmission Sequence Number field of the chunk header 240 (sometimes used within data chunks 222C only)
245 Stream Identifier field of chunk header 240 (sometimes used within data chunks 222C only)
246 Stream Sequence Number field of chunk header 240 (sometimes used within data chunks 222C only)
247 Payload Protocol Identifier field of chunk header 240 (sometimes used within data chunks 222C only)
250 Chunk payload
251 CONTROL, AUTH, PATH, INSTRUCTION, PRG_DATA chunk 222A payload
252 PLD_DATA chunk 222B payload
300 SDCD-capable host 110 components
301 Traditional IP Network
302 Traditional, non SDCD-capable, IP host
311 Non SDCD-capable application
312 SDCD-capable remote application running on the traditional, non SDCD-capable, host 302
313 SDCD-capable proxy application running on the SDCD-capable host 110 and providing gateway service to SDCD-capable remote applications 312
314 SDCD-capable local application running on the SDCD-capable host 110
320 Connection between IP host 302 and IP network 301
330 Non SDCD-aware content exchange between applications in IP network
340 SDCD-aware content exchange between applications in IP network
351 IP network 301 input/output channel application programming interface
352 IP network 301 input/output channel library
353 IP network 301 level 3 socket
361 SDCD platform 100 high-level networking application programming interface (e.g. for pub/sub streaming)
362 SDCD platform 100 high-level networking library (e.g. pub/sub streaming library)
363 SDCD platform 100 low-level networking application programming interface (i.e. input/output channel)
364 SDCD platform 100 low-level networking library (i.e. input/output channel library)
365 SDCD platform 100 communication endpoint associated with SDCD socket 112
371 Network level 2 raw socket of the computation environment 372
372 Computation environment of the host 110

373 Underlying physical or virtual hardware of the host 110
400 SDCD service development and management diagram
401 SDCD platform 100 customer's development and operations team
402 SDCD platform 100 administrator
403 SDCD platform 100 customer's domain administrator
404 SDCD platform 100 customer's topic administrator
405 SDCD platform 100 customer's application development team
411 Designing service template 910 and creating configuration for every communication endpoint role
421 Creating user (i.e. platform customer) domain and assigning the administrator to the domain
422 Allocating SDCD platform resources, for example the pool of the group identifiers, to the domain
423 Installing the service template 910 for the use in the domain
431 Creating a user account and assigning a domain role to the user
432 Creating a topic and designating domain resources to the topic administrator 404
433 Assigning the topic administrator role to one of the users in the domain
441 Creating topic roles by customizing the service roles, assigning the topic roles to the users
451 Authorizing the actions performed by the platform 402, domain 403, and topic 404 administrators on the SDCD controller 130
461 Choosing communication model and associated service template 900 for the use by the application 312-314
462 Specifying the way to instantiate the topic and defining the topic role(s) for the application 312-314
463 Linking SDCD library 362 and/or 364 to the application 312-314
500 SDCD service management and operations diagram
501 SDCD platform 100 host owner
502 SDCD platform 100 switch owner
511 Spinning up a SDCD host 110 and establishing network connections 140
512 Running an application 313-314, creating endpoints 365 for every topic role, obtaining configuration data for the endpoints
513 Generating within the application one or a plurality of content delivery instruction sets and linking each set to the related communication endpoint 365
514 Registering the communication endpoint 365
515 Sending data via the communication endpoint 365 where delivery instructions are appended to data
521 Booting up a SDCD switch 120 and establishing network connections 140
522 Executing the packet embedded content delivery instructions to define actions and performing the actions on the packet 200
531 Updating the network graph with the information about the running status of the switches, hosts, and applications (i.e. application communication endpoints)
532 Providing the endpoint configuration 920 based on the role of the application in the topic
600 SDCD controller 130 components and interactions between them
610 SDCD controller 130 administrative web interface
620 SDCD controller 130 service support module
621 SDCD controller 130 service support interface
622 SDCD controller 130 Service Registry functional entity
623 SDCD controller 130 Path Finder functional entity
630 SDCD controller 130 databases of network resources, services, and users
640 SDCD controller 130 network control module
641 SDCD controller 130 Net Map functional entity
642 SDCD controller 130 Net Policy functional entity
643 SDCD controller 130 network control interface
650 SDCD controller 130 identity service component
661 Interaction between SDCD controller 130 and platform administrator 402
662 Interaction between SDCD controller 130 and either domain 403 or topic 404 administrator
663 Interaction between SDCD controller 130 and SDCD host 110
664 Interaction between SDCD controller 130 and SDCD switch 120
665 Identity service related interactions between SDCD controller 130 and all the participants 402-404, 501-502
700 SDCD-capable switch 120 functional entities and interactions between them
711 SDCD switch 120 functional entity responsible for receiving packets
712 SDCD switch 120 functional entity responsible for storing packets
713 SDCD switch 120 functional entity responsible for transmitting packets
721 SDCD switch 120 functional entity responsible for parsing and authorizing, preparing metadata, defining action set
722 SDCD switch 120 functional entity responsible for reading instructions and program data
723 SDCD switch 120 functional entity responsible for executing instructions
724 SDCD switch 120 functional entity responsible for updating program data and path description
725 SDCD switch 120 functional entity responsible for executing action set
726 SDCD switch 120 functional entity responsible for maintaining flow records database
727 SDCD switch 120 functional entity responsible for maintaining action sets database
731 SDCD switch 120 functional entity responsible for support of controller-side OpenFlow interface
741 SDCD switch 120 functional entity responsible for maintaining ingress, execution, and egress policies
742 SDCD switch 120 functional entity responsible for support of interface with SDCD controller 130
743 SDCD switch 120 functional entity responsible for management of switch and connections states
744 SDCD switch 120 functional entity responsible for performing standard OAM functions such as booting, CLI, etc.
800 Main method of self-driving content distribution
801 Designing a service template 910 and creating communication endpoint configuration 920 for each service role defined within the template
802 Publishing the service template 910 on the SDCD controller 130
803 Choosing one or plurality of communication models and associated service templates for the use by the application 312-314, linking the related SDCD libraries 362 and/or 364 to the application 804 Creating a topic on the controller by customizing the service template 910 and enabling the topic for the use by the group of host owners 805 Spinning up the SDCD-capable host 110, establishing the network connection 140 with the SDCD-capable switch 120, and running the SDCD-capable application 313-314

806 Creating the communication endpoint(s) 365 to access the topic from the host 110 by the application 313-314 and requesting endpoint configuration 920 from the controller 130

807 Binding configuration 920 to the endpoint 365 by the application 313-314 and requesting any additional service-related settings (e.g. path) from the controller 130

808 Generating delivery instructions using data received from the controller 130 and requesting the controller for content exchange authorization 130 by the application 313-314

809 Sending data accompanied by delivery instructions (in the form of the special packet 200) via the communication endpoint 365 by the application 313-314

810 Receiving data accompanied by delivery instructions at the SDCD-capable switch 120

811 Executing delivery instructions to define what actions are to be performed on the packet 200 by the switch 120

812 Performing the actions in such way modifying, trapping, storing, forwarding, discarding the packet 200 by the switch 120

813 Receiving the packet 200 by the receiver application 313-314 working with the same topic as the sender application and running on the receiver host 110 located within the same administrative group of hosts as the sender host 900 Service template components 910 Service template 900 header 920 Communication endpoint configuration for the particular service role 930 Special packet 200 specification for the particular service role 931 Description of the default communication pathways to use in special packet 200

932 Delivery instruction map and binary to use in special packet 200

933 Program data structure and default values to use in special packet 200

934 Authorization token default values to use in special packet 200

940 Communication endpoint management settings

950 Service template 900 communication model graph

960 Service template 900 delivery instructions repository

970 Service template 900 communication data structure

980 Service template 900 authorization requirements

990 Service template 900 channel management requirement

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a schematic view 100 of interactions between disclosed elements is used to present the self-driving content distribution platform comprising a plurality of SDCD-capable hosts 110, a plurality of SDCD-capable switches (i.e. engines) 120, a SDCD controller 130, a plurality of connections between SDCD switches and SDCD hosts 140, a plurality of connections between either a SDCD switch or host and a SDCD controller 150, a special packet 200, and a plurality of traditional IP-network related entities 301-330. As shown, any SDCD-capable host 110 may interact with any IP host 302 being connected to IP network 301 by means of standard IP connections 320.

A SDCD-capable host 110 may comprise a SDCD agent 111 and either a local 314 or proxy 313 application. All the interactions between the agent 111 and the local 314 or proxy 313 applications are organized by employing only one universal interface 112. A plurality of local 314 and proxy 313 applications may exchange data across the SDCD network 141 by means of special packets 200 which are to be assembled and disassembled, on behalf of the local and proxy applications, by the agent 111.

The proxy application 313 may serve a plurality of remote applications 312 and in such a way play the role of an intermediary between remote applications and the agent 111 of the host 110 the proxy application is running on. To reach the proxy application 313, a remote application 312 may create a special connection 340 over the IP network 301.

The local application may 314 interact with an external application 311 over the IP network 301 using standard IP-connections 330.

A SDCD-capable switch may contain a processor 121.

SDCD-capable switches 120 and hosts 110, alongside with a plurality of connections 140 between either SDCD-capable switches themselves or SDCD-capable switches and hosts, may form an overlay SDCD network 141. Overlay network connections 140 may be created, but not limited, using the existing network resources such as: physical connections (e.g. untagged Ethernet links), virtual layer 2 connections (e.g. VLANs), and virtual layer 3 connections (e.g. VxLAN tunnels).

In some cases, as described further below, the SDCD switch 120 may be coupled with the OpenFlow switch 122 by means of standard OpenFlow channel 123. In this deployment scenario, the SDCD switch is simply called the SDCD engine.

Figure 2:
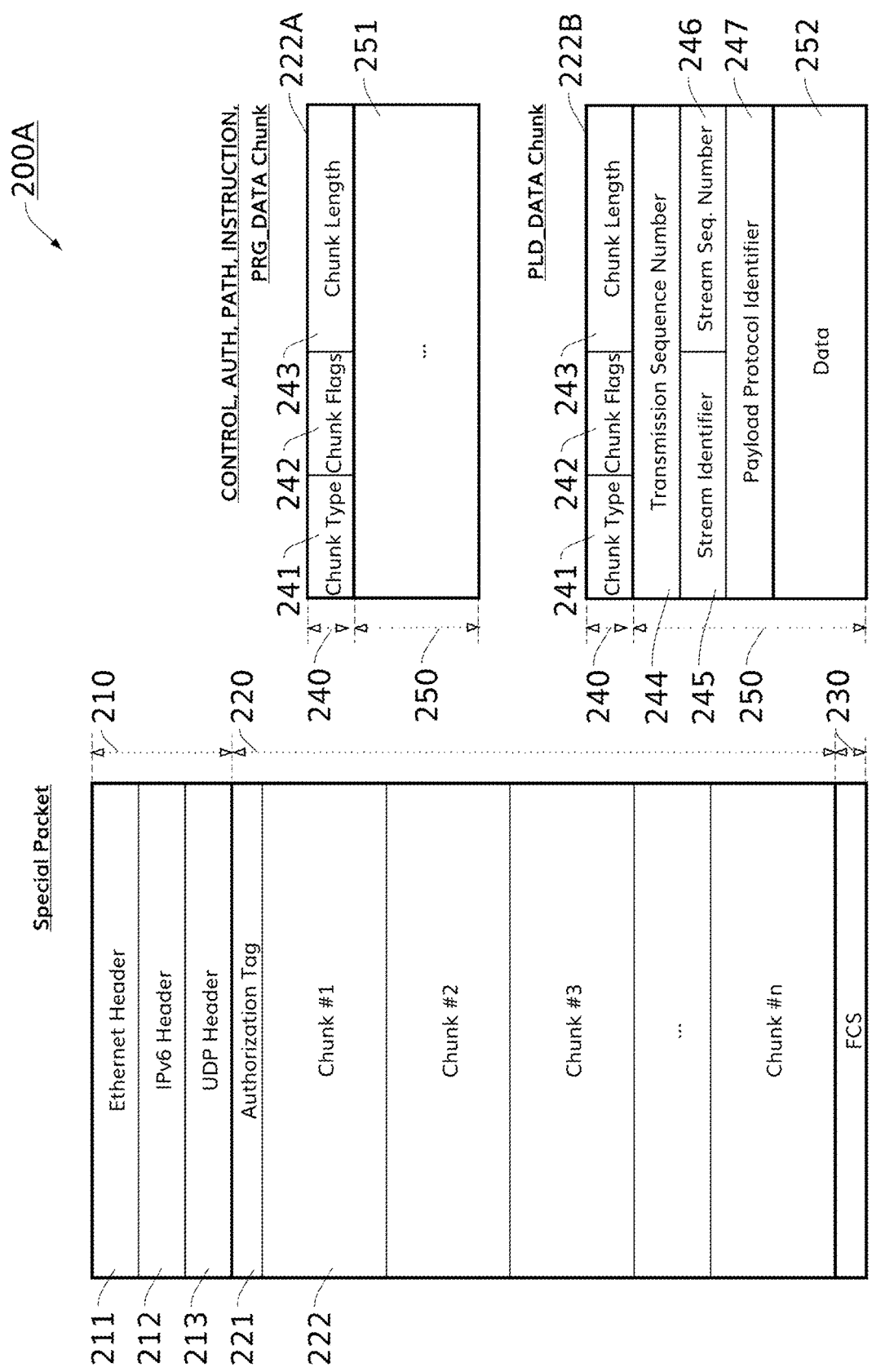
FIG. 2 is a schematic view of one of disclosed special packet structures

Referring to FIG. 2, a schematic view 200 of one of the disclosed special packet structures 200A is provided. The disclosed structure employs the IPv6 source-specific multicast frame to carry SCTP-like structured payload. The presented structure of the packet may comprise header 210, payload 220, and trailer 230.

In its turn, the header 210 of the packet may comprise Ethernet header 211, IPv6 header 212, and UDP header 213.

The Ethernet header 211 may contain the MAC address of sender's host 110 in Source MAC Address field and the topic identifier in Destination MAC Address field. The IP header 212 may contain the sender's host 110 IP address and the same topic identifier, extended with prefix FF3x::/96, in the Destination IP Address field. The UDP header 213 may contain the source application's communication endpoint identifier in the Source UDP Port field and optional flow control information in the Destination UDP Port field.

The payload 220 of the packet may comprise an authorization tag 221 and a sequence of chunks 222. The authorization tag 221 may be deemed as a reference to a content delivery flow's authorization data set. Each packet 200A needs to be authorized to traverse a SDCD network thus all the packets carry the authorization tag 221. A sequence of chunks 222 may follow the authorization tag. Depending on the category of data carried by the chunks, different types of chunks may be defined within the SDCD platform, e.g. CONTROL, AUTH, PATH, INSTRUCTION, PRG_DATA, PLD_DATA. Each chunk 222 may comprise chunk header 240 and chunk payload 250. The chunk header 240 may contain Chunk Type field 241, Chunk Flags field 242, and Chunk Length field 243. The PLD_DATA chunk 222B may contain the same chunk payload fields as the SCTP protocol's DATA chunk (chunk type 0). Thus, the inherited fields of the PLD_DATA chunk 222B may look like these: Transmission Sequence Number 244, Stream Identifier 245, Stream Sequence Number 246, Payload Protocol Identifier 247, Data 252. At the same time, the CONTROL, AUTH, PATH, INSTRUCTION, PRG_DATA chunks 222A may have an SDCD-specific chunk payload structure 251.

The trailer 230 of the packet may contain a standard frame check sequence (FCS) as it is specified for Ethernet frames.

Figure 3:
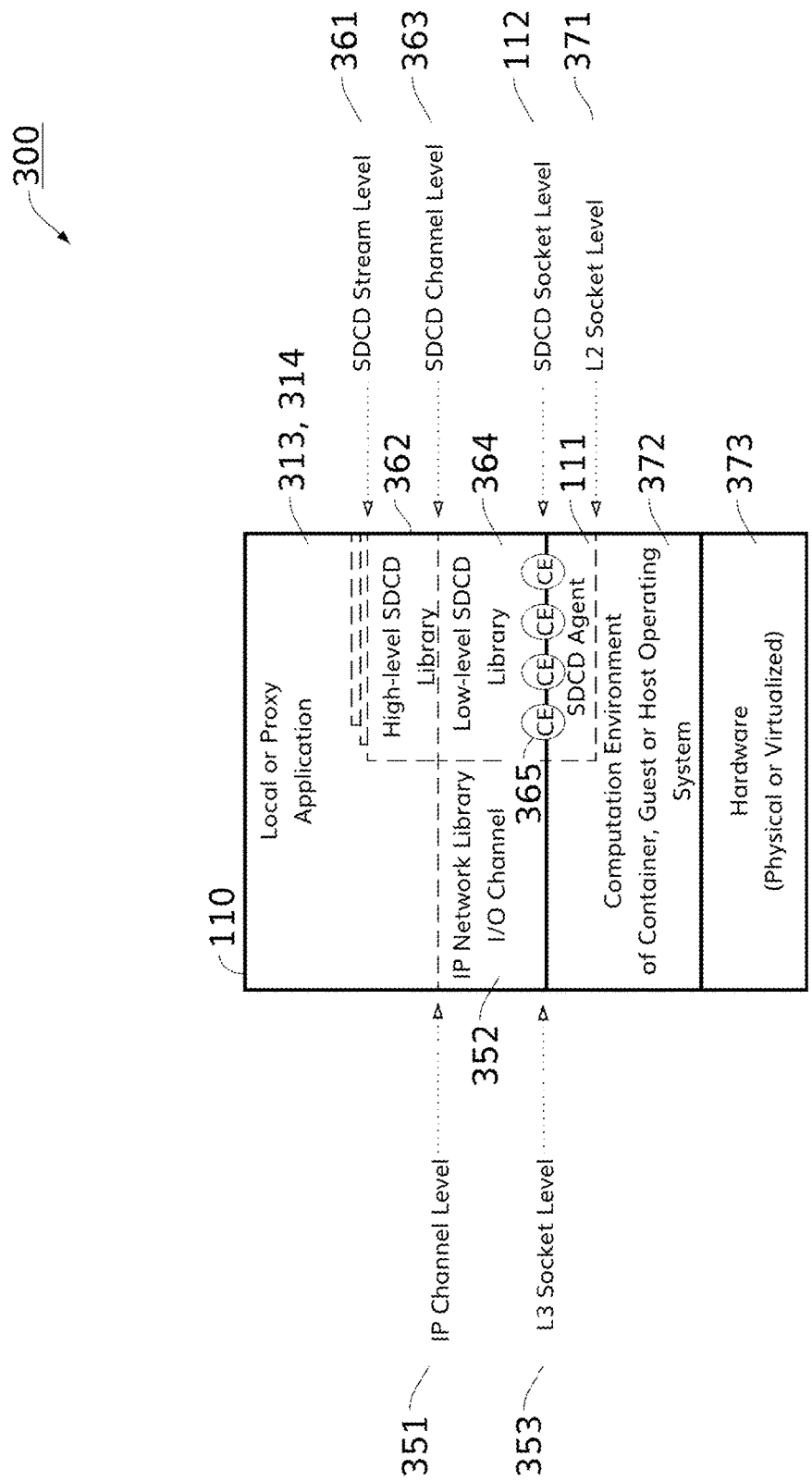
FIG. 3 is a schematic view of host components

Referring to FIG. 3, a schematic view 300 of SDCD-capable host components is shown. In order to be SDCD-capable any host 110 should contain some SDCD-specific components alongside the standard ones. First of all, an SDCD agent 111 is supposed to be installed on the host. An agent 111 may create a universal interface 112 on SDCD socket level to enable access to SDCD network for applications 313-314 running on the host 110. The applications 313-314 themselves may be programmed for content distribution employing different levels of abstractions. On SDCD-stream level 361 of abstraction, an application uses APIs of high-level SDCD libraries 362 to send and receive 'data streams'. A variety of communication models may be supported through developing different high-level libraries, for example, to publish-subscribe streams, to perform consensus networking. In its turn, the high-level library 362 may work on SDCD-channel level 363 of abstraction. Programming interface of SDCD input-output channel may be provided by a low-level SDCD library 364. As a SDCD-channel termination point, the low-level SDCD library 364 may create one or a plurality of communication endpoints 365, one per each channel. Every endpoint is bound to a corresponded SDCD socket on the agent 111 level. The agent itself may utilize one or a plurality of standard network interfaces, e.g. raw Ethernet sockets or tunnel endpoints.

Alongside with using the SDCD libraries, the application may still work with one or a plurality of standard networking libraries 352, in such a way receiving access to an existing IP network on a channel level 351 and utilizing standard layer 3 socket 353 provided by the host operating system.

The host operating system may provide a computation environment 372 for applications 313, 314. The agent 111 may be deemed as a part of the host's computation environment 372. It makes no difference what host deployment model is used to run the SDCD agent and SDCD-capable applications—a container, virtual machine, or physical server—as long as the computation environment has an addressable physical or virtual network interface provided by the physical or virtualized hardware 373 it runs on.

Figure 4:
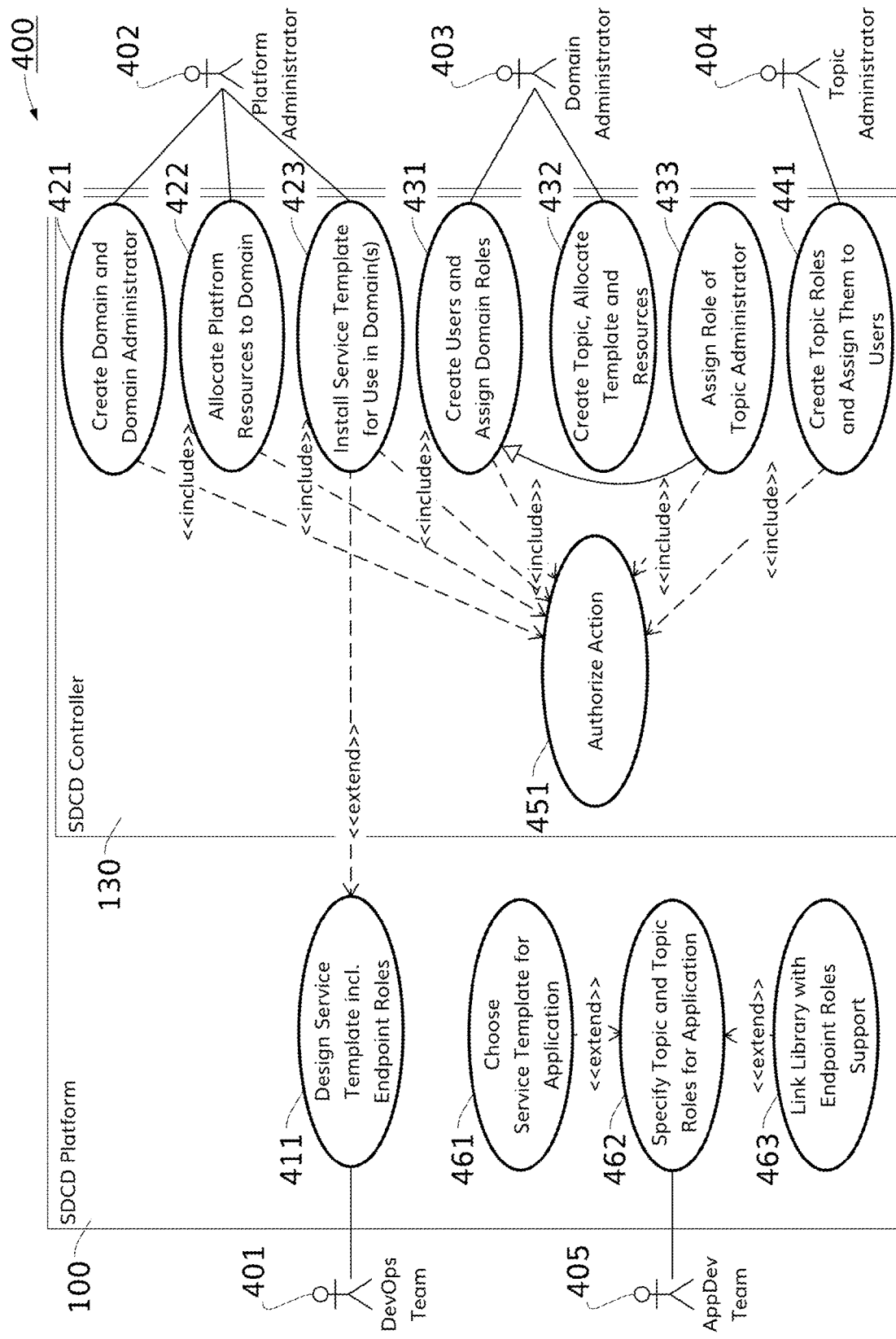
FIG. 4 is a schematic view of disclosed methods for service deployment and management

Referring to FIG. 4, a schematic view 400 of disclosed methods for service deployment and management within SDCD platform is provided. Due to the nature of the invention, all the network services are completely virtual in SDCD network. Thus, all the processes of service deployment may only occur in the application and controller 130 space but not in the switch, i.e. network appliance, space.

Any service deployment may begin with designing 411 a service template by, as an example, the platform customer's development team. During the service template design process, the development team creates a configuration for every service endpoint role defined within this virtual service.

To enable the service, a platform administrator 402 may create 421 a user domain and assign a domain administrator to it. The platform administrator 402 may allocate 422 shared platform resources, e.g. a pool of group identifiers, for use in the user domain. Also, the platform administrator 402 may install 423 service templates, received from one or a plurality of development teams 401, and enable them for use in one or a plurality of user domains.

A user domain administrator 403 may create 431 one or a plurality of users in its own domain. One or a plurality of system roles may be assigned to each user by the domain administrator. The domain administrator 403 may create 432 one or a plurality of topics in the domain. Instantiating of any topic may be accompanied with allocation of platform resources, e.g. a group identifier, and designation of particular service template to the topic. To delegate the permissions to manage content distribution within the topic, the domain administrator 403 may assign 433 the topic administrator role to one or a plurality of users.

A topic administrator 404 may create 441 a set of topic roles and assign one or a plurality of topic roles to the users in the domain. Any topic role may be created only by customizing the service roles from the service template designated to the topic.

All the actions performed by the platform, domain, and topic administrators may undergo 451 an authorization procedure.

A platform customer's application development team 405 may decide on the communication model to be used for communications between applications and choose 461 one or a plurality of service templates supporting this model. During application development process the development or application development team 405 may specify 462 the way in which the application should both instantiate a topic, i.e. content distribution context, and define application's role(s) in the topic. At this point, one or a plurality of libraries 352 and 362 may be linked 463 to the application, enabling the reuse of the chosen communication model's pre-programmed endpoint logic.

Figure 5:
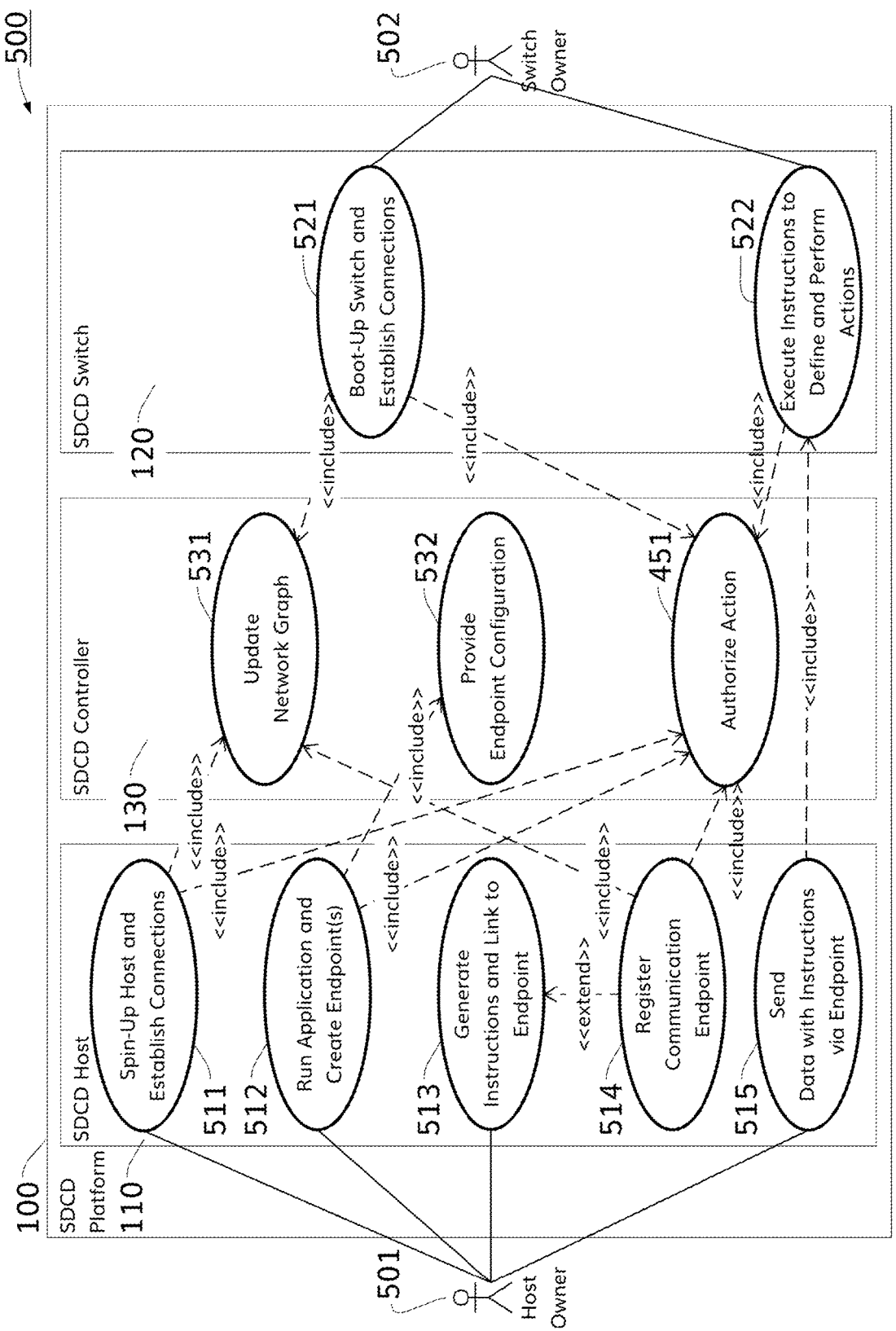
FIG. 5 is a schematic view of disclosed methods for service management and operations

Referring to FIG. 5, a schematic view 500 of disclosed methods for service management and operations within SDCD platform is provided.

A host owner 501 is given the permissions to initiate a content exchange within the SDCD platform. The host owner 501 may issue content delivery instructions that any switch owner 502 must execute. In order to do that, the host and switch owners may have in their possession one or a plurality of SDCD hosts 110 and SDCD switches 120 respectively. An SDCD controller 130 may be deemed as an intermediary between hosts and switches that authorizes their interaction and retains data in such a manner as to assist all the participants to communicate with each other.

To begin a content exchange, a host owner 501 may spin up 511 one host 110 (e.g. container, virtual machine, or physical server) or a plurality of hosts and initiate the process of network connections 140 establishment. In case the host owner's actions are authorized 451, the SDCD controller updates 531 the network graph by adding the host(s) and connection(s) to the network map. Then, in a next step, the host owner 501 may run 512 an application 313-314 that may create a single service endpoint 365 or a plurality of them—one endpoint per each topic role the application wants to use. At this stage, the application may obtain some endpoint configuration settings by retrieving 532 topic-related data (e.g. authorization data, communication pathways, pre-programmed communication logic in the form of content delivery instruction blocks, structure and initial values of program data) from the SDCD controller 130. After preparing all the data needed for endpoint configuration, the application generates 513 content delivery instructions (alongside with pathway description and program data) and binds them to the endpoint. During the endpoint registration process 514, the application may receive the authorization 451 for the use of the endpoint for content exchange and get the endpoint registered and displayed on the network map 531. The successfully registered endpoint may be used to send or receive 515 content accompanied with the authorized content delivery instructions (i.e. special packets 200) by the application 313-314.

To support a content exchange, the switch owner 502 may boot-up 521 a switch or a plurality of switches and initiate the process of network connections 140 establishment. In case the switch owner's actions are authorized 451, the SDCD controller updates 531 the network graph by adding the switch(es) and connection(s) to the network map. As soon as the SDCD switch 120 is set up, it may start receiving special packets 200 with embedded content delivery instructions. The switch 120 may execute 522 the delivery instructions in order to define and perform actions on the packet 200. During the packet processing, the switch 120 may restrict 451 the actions, the packet is allowed to perform at the switch, in accordance with the authorization data associated with the packet.

Figure 6:
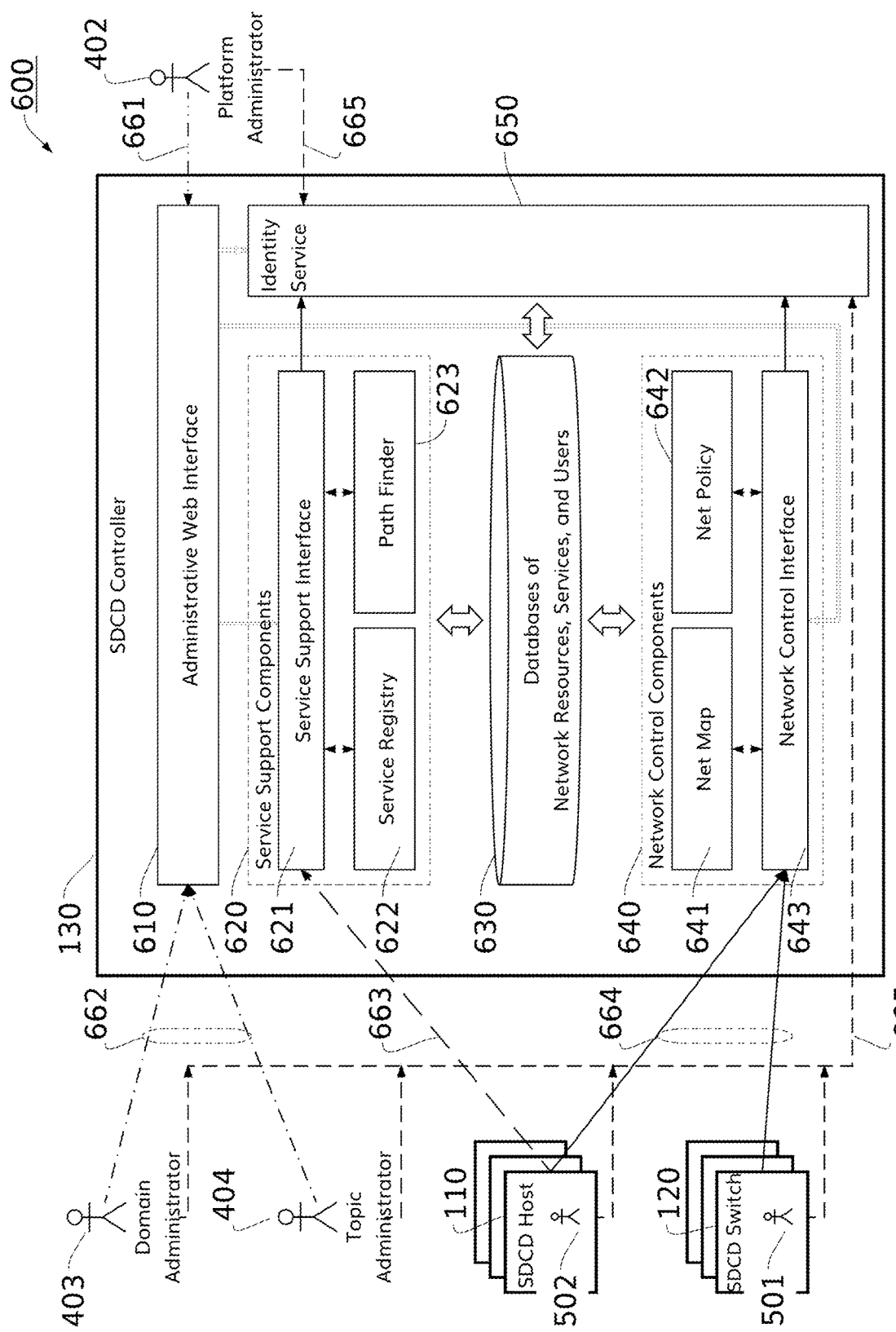
FIG. 6 is a schematic view of controller components and their interactions

Referring to FIG. 6, a schematic view 600 of controller components and interactions between them is shown.

A SDCD controller 130 occupies a central place in the SDCD paradigm. Platform administrator(s) 402, domain administrator(s) 403, and topic administrator(s) 404 may use the controller's administrative Web interface 610 to execute service deployment and management tasks 400 as well as service management and operations tasks 500. To perform the aforementioned tasks both the RESTful API and Web interface may be used 661, 662 by the administrators. The administrative Web interface 610 may provide access to service support components 620 and network control components 640 of the controller.

The service support set 620 of the controller components may comprise service support interface 621, service registry 622, and path finder 623. The service support interface 621 may act as RESTful API 663 gateway for the service registry 622 and path finder 623 components. This interface 621 may allow a plurality of SDCD hosts retrieve a service endpoint configuration kept by the service registry 622 as well as, in addition to the configuration, the detailed description of the pathways through the SDCD network calculated by the path finder 623.

Controller's databases 630 may keep data on the platform resources, services, and users in a consistent manner and such that the data is accessible by all the controller components.

The network control set 640 of the controller components may comprise a network control interface 643, net policy 642, and net map 641. The network control interface 643 may serve as a two-way control protocol 644 handler allowing the net policy 642 and net map 641 components to participate in the processes of switch 110 and host 120 registration as well as policy- and crypto-related material distribution.

All the interactions between the controller 130 and other SDCD platform actors (e.g. administrators 402-404, node owners 501-502) may undergo an authorization procedure 665 empowered by the authorization service component 650 of the controller.

Figure 7:
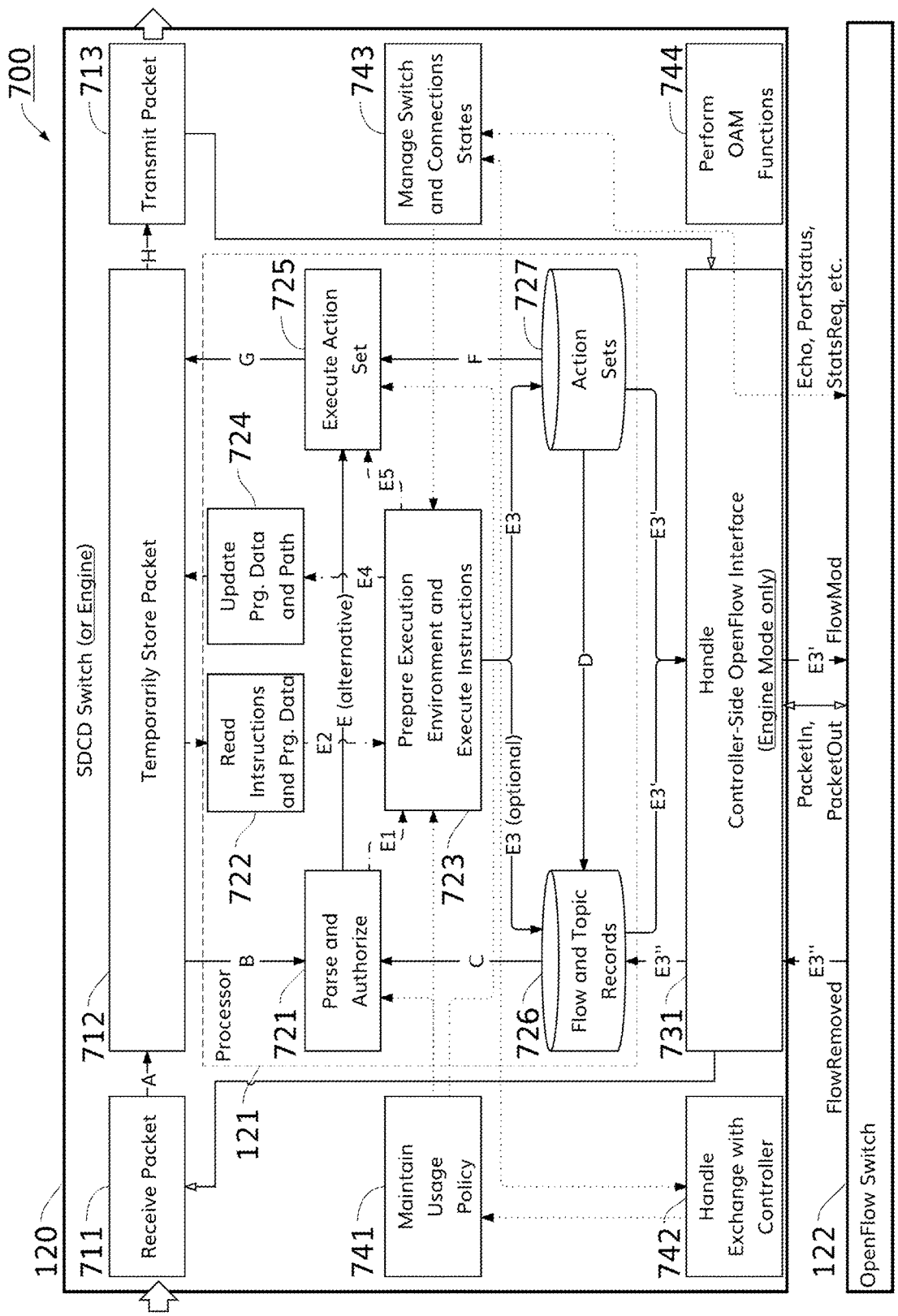
FIG. 7 is a schematic view of switch components and their interactions

Referring to FIG. 7, a schematic view 700 of switch components alongside with packet processing procedure within the switch is shown. A sequence of the processing steps are disclosed for packets 200 traversing the switch 120.

In a first step, the switch receives 711 the packet. If the basic packet structure is valid, the switch temporarily stores 712 this packet for further processing.

A next step includes parsing and authorization 721 of the packet. If both—the SDCD-specific packet structure validation and the authorization—are successful, this step expands to packet metadata preparation and making an attempt to immediately define the action set for this packet. At this step 721, the switch repeatedly refers to flow and topic records 726 during the packet processing. The switch may both read and write these records. Also, at this step 721, the packet processing policy, maintained 741 by the switch, is applied. Based on the outcome of this step 721, two transitions in packet processing are possible. If the action set defined, the next step will be the execution 725 of this action set. If not, additional steps have to be made in order to define the action set. These steps include execution 723 of content delivery instructions.

At the instruction execution step 723, the switch prepares an environment for instruction execution what includes loading the data gathered at the previous step 721 into a special processor. The switch reads 722 instructions embedded in the packet. This step 722 may include loading program data, embedded in the packet or pre-stored on the switch, into the special processor. As well, the switch enables access to the internal data regarding its running status 743 for the instructions. As soon as execution environment is set up, the switch begins execution of content delivery instructions. During the execution 723, instructions may update the packet program data. When the instruction execution 723 is finished, the switch receives the required action set 727 for applying on the packet. Optionally, the output of instruction execution may update the flow and topic records 726 stored at the switch what makes possible to reuse the produced action set and data by other packets. Instruction access to all the data and their actions are subject to the packet processing policy, maintained 741 by the switch.

The execution 725 of the required action set may result in discarding or modifying the packet kept in the temporary storage 712 as well as transmitting 713 the original or modified packet to one or a plurality of destinations. At this step, the packet processing policy, maintained 741 by the switch, is also applied—to keep the actions within the boundary defined at the packet authorization step 721.

As a part of the policy 741 and state 743 management processes, the switch exchanges 742 data with the SDCD controller.

The 721-727 functional entities form the switch processor 121. While the 711-713 functional entities are components of the switch forwarding plane, the 741-743 functional entities are parts of the switch control plane.

In some deployment scenarios, the switch may function as a SDCD engine. In this mode, the SDCD engine 120 is bound to the OpenFlow switch 122, so that all the packets pass through the OpenFlow switch 122. This OpenFlow switch 122 may redirect special packets to the SDCD engine 120 for their processing. In such a way, the SDCD engine 120 may receive and send packets 200 encapsulated into the OpenFlow messages from and to the OpenFlow switch 122. Via OpenFlow channel, the SDCD engine 120 is presented to the OpenFlow switch 122 as an OpenFlow controller. In the engine role, the SDCD switch 120 may handle 731 all the OpenFlow-related processes such as flow management, port status monitoring, statistic retrieving. For example, when the action set is created after instruction execution, the action set may be installed not only locally at the SDCD switch but may be sent to the OpenFlow switch 122 using a standard Flowmod message. This feature allows the use of the OpenFlow switch, if needed, as a fast forwarding path for the special packets which do not require instruction execution.

Figure 8:
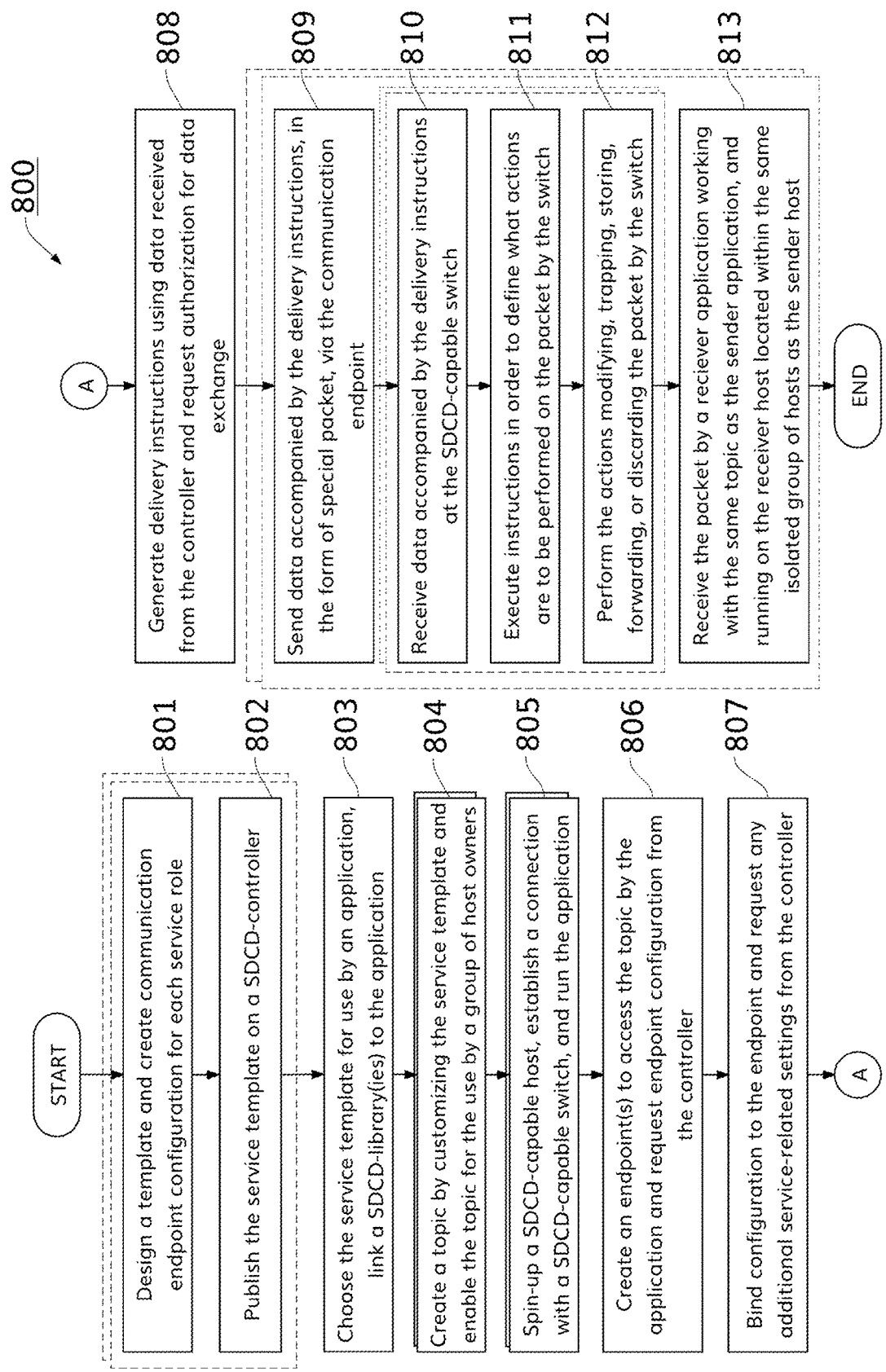
FIG. 8 is a flowchart of disclosed methods for self-driving content distribution

Referring to FIG. 8, a flowchart 800 of disclosed methods of self-driving content distribution is depicted.

A first step includes the designing a service template and creating communication endpoint configuration for each service role defined within the template 801. At a next step, the service template is published on the SDCD controller 802. Shown dotted lines around the blocks 801-802 represent a repeating nature of this two coupled processes—there are no restrictions how many templates could be developed and published. When the service template is developed, service roles from the template may be chosen for the use by an application as well as a proper SDCD-library(ies) may be linked to the application 803.

Another step includes the creating and enabling a topic on the controller 804. From the controller perspective, any topic is deemed as an instance of the particular service that is described by one of the published templates. Thus, the replicating and customizing the service templates leads to the instantiating a topic at this step. In order to make this topic accessible, permissions are granted on one or plurality of host owners. The shown several rectangles mean many topics may be created by replicating and customizing the same service template.

A following step includes the spinning up a SDCD-capable host and establishing one or a plurality of network connections with SDCD switch(es) 805. Running an SDCD-application on the host concludes this step. Depicted several rectangles mean a plurality of hosts may be spun up by the same or different host owners.

On its start, the application creates one or a plurality of communication endpoints on the host 806. In order to do that, the application specifies one or a plurality of topics it wants to work in and requests the endpoint configuration(s) for each topic from the controller. The controller may have the topic role already defined for the application and, in this case, provides a correspondent configuration to the application. Optionally, if several topic role(s) defined for a user, the controller may expect receiving the topic role identifier in the request from the user's application.

A next step includes the binding of the received configuration to the endpoint by the application 807. At this step, the application may request any additional service-related settings from the controller, e.g. paths, identifiers of the destination or intermediary nodes.

At the following step, using data received from the controller, the application generates content delivery instructions 808. The application may request the controller for authorization of using particular pathways, instructions, and program data at this step. But it is possible to get authorization all together with endpoint configuration data either at the step 806 or 807.

As the endpoint is set up, the application may send data accompanied with content delivery instructions using this endpoint 809. Based on endpoint configuration, the application may send special packets containing content delivery instructions only to request delivery of content. Thus, any endpoint may function as transmitting or receiving entity in the network. The case of the receiving a packet is shown at the end of the repeating sequence of the blocks that begins with the step 809 and ends with the step 813.

At a next step, a SCDC switch receives 810 data accompanied by delivery instructions. The switch executes 811 the delivery instructions to define what actions are to be performed on the packet. The switch performs 812 the actions in such a way modifying, trapping, storing, forwarding, or discarding the packet. When the packet is forwarded to another switch or a plurality of switches, the steps 810-812 are being repeated again.

Eventually, one or a plurality of applications may receive 813 the packet. To receive the packet, due to a strict authorization procedure enforced by SDCD switches, the applications must work with the same topic as the sender application and run on the host that belongs to the same domain as the sender host.

Figure 9:
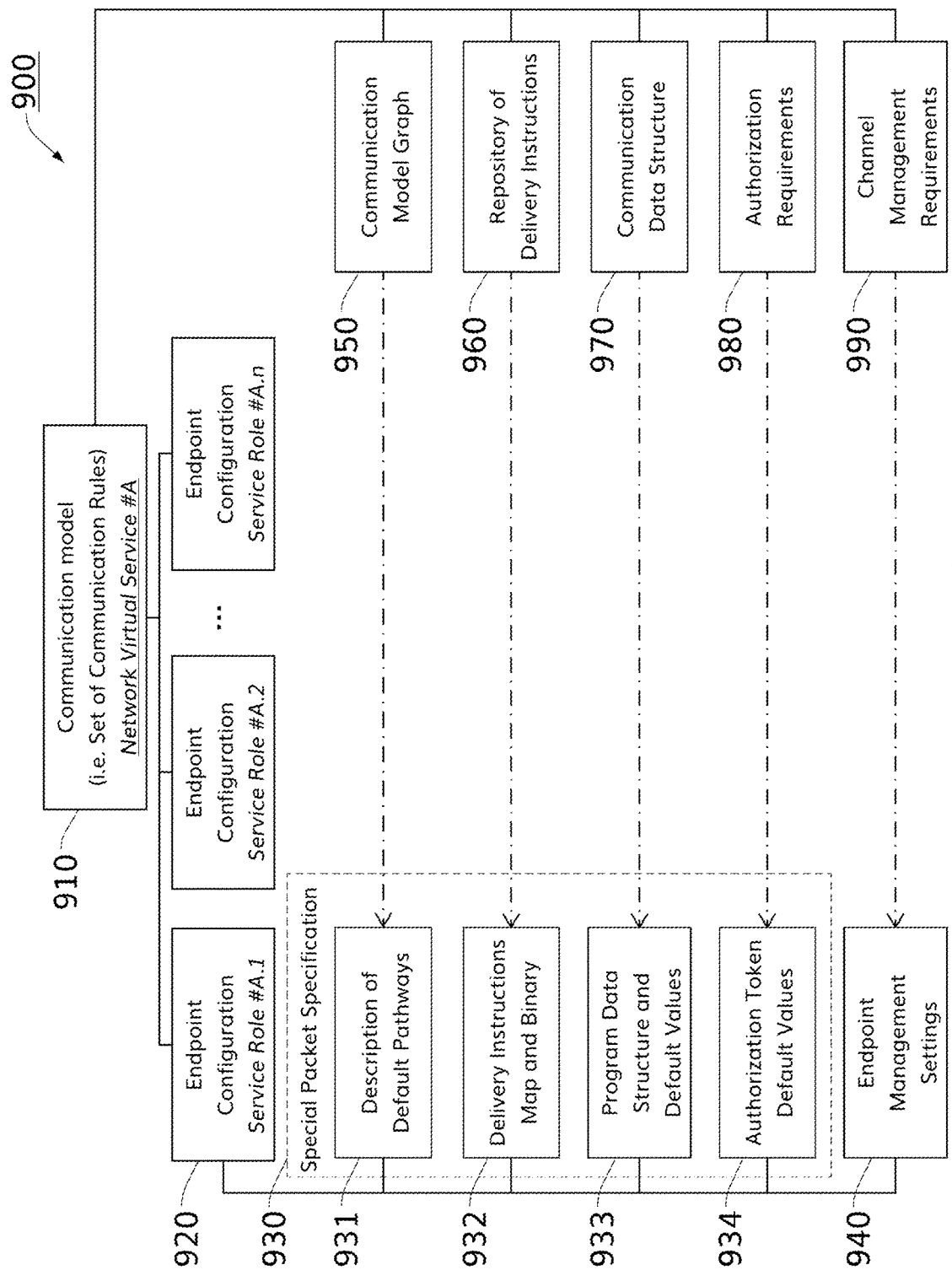
FIG. 9 is a schematic view of a service template

Referring to FIG. 9, a schematic view 900 of virtual service template 910 is disclosed.

Network Virtual Service Template 910 describes a set of communication rules for content exchange participants. Such a set of rules frames a particular communication model. A variety of communication models might be described by means of service template—from the simplest one like a sender-receiver model to more complex ones such as, for example, publish-subscribe and consensus networking models.

Each service template composed of, at least, one or, more common, a plurality of service roles. Every single service role has a corresponding configuration 920 for application communication endpoints. On a low level, such configuration contains a special packet specification 930 and a set of communication endpoint management settings 940.

A set of SDCD-channel management requirements 990 governs all the communication endpoint management settings 940 within the template. Such the requirements 990 determine, for example, keep-alive intervals, operation timeouts, etc.

The special packet specification includes description of default communication pathways 931, content delivery instruction map and binary 932, program data map and default values 933, authorization token's default values 934.

The service template 910 may contain the description of a communication graph 950 that defines, for example, rendezvous points, main and backup pathways. Thus, each service role's endpoint configuration 920 may inherit a part of the communication graph as the description of its default communication pathways 931.

Content delivery instructions are stored within the service template 910 in the instruction repository 960. All the stored instruction blocks may be reused within the template across multiple service roles to set the map and binary 932 of their content delivery instructions.

A communication data structure 970 within the service template is used to describe organization of the data used to facilitate communications. Every service role derives data for its Program Data Map and Default Values section 933 from the template's communication data structure 970.

Channel management requirements 990 dictate which of endpoint management settings 940 are to be used across all the service roles within the template. In such a way, consistency of endpoint management settings is guaranteed all across the template.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Items

1. A method of network virtual service development, management, and operations in communication network, the method comprising the steps of:

designing a service template to describe particular set of communication rules for applications by the development team;

defining, within the template, all possible communication roles of applications by the development team;

creating, within the template, communication endpoint configuration for every service role by the development team;

publishing the template on the controller by the domain administrator;

choosing the service template(s) for use by the application development team;

defining application communication role(s) based on the template(s) by the application development team;

linking library(ies) with communication endpoint role(s) support by the application development team;

copying, customizing, and enabling, within the controller, the template for the use in the topic (by the applications located on the isolated group of hosts) by the topic administrator;

spinning up a host and establishing connection with a switch by the operations team or automatically;

running the application (with the linked library(ies)) on the host by the operations team or automatically;

specifying topic(s) and topic role(s) for the application by the operations team or automatically;

creating communication endpoint(s) on the host for each application communication role by the application;

requesting endpoint configuration from the controller by the application;

binding configuration to the endpoint and requesting any additional service-related settings (e.g. path) from the controller by the application;

generating content delivery instructions based on the endpoint configuration and additional settings received from the controller by the application;

sending data accompanied with the delivery instructions, in the form of special packet, via the communication endpoint by the application;

receiving data accompanied with the delivery instructions by the switch;

executing delivery instructions in order to define the actions are to be performed on the special packet by the switch;

performing the actions—modifying, trapping, storing, forwarding, or discarding the special packet by the switch;

transmitting the special packet to the next switch en packet route or to the receiver host by the switch;

receiving the special packet by the application working with the same topic on the receiver host located within the same isolated group of hosts (i.e. domain) as the sender.

2. A network host for running SDCD-capable applications, the network host comprising functional entities of:

a physical or virtualized hardware for receiving and transmitting special packets to and from the network as well as providing computational resources;

a computational environment for applications—it might be a container, operating system of virtual machine or physical server, or any other environment that is capable to run applications and can provide access to level 2/3 sockets, wherein the computational environment is adapted to functioning in self-driving content distribution environment due to:

an agent that facilitates the interactions between applications and network, the agent provides new communication endpoints capabilities to applications on the upper level and, at the same time, utilizes the standard level 2 networking capabilities of computational environment on the lower level;

an application for producing and consuming special packets, wherein the application is adapted to functioning in self-driving content distribution environment due to:

an application library(ies) that makes possible to exchange data among applications in the self-driving content distribution environment, the low-level SDCD library provides the universal—service and role independent—application programming interface of input-output channel that allows application developers to directly access self-driving content distribution functions such as assembling and disassembling packets or interacting with controller, the high-level SDCD libraries provide service and/or role specific application programming interfaces—e.g. pub-sub stream—that allow application developers to simplify usage of networking functions under specific scenarios (i.e. services).

3. A network switch for performing actions on the special packets. The switch might be implemented as a standalone SDCD-capable appliance comprising the both instructions execution and packet relay functional entities. Alternatively, the instructions execution functional entity might be implemented as a component by itself—in this case it is called an engine—that has to be integrated with existing OpenFlow-based switch which provides packet relay functions in this scenario. An engine implementation might be software- (e.g. standard Linux application) or hardware-based (e.g. network interface card, network processing unit, standalone switch extender) component. Either type of the engine implementations might be integrated with a fully virtualized (e.g. Open vSwitch) or hardware-based OpenFlow switch. The network switch comprises functional entities:

a component for the execution of delivery instructions (i.e. a processor),
wherein the processor:
parses and authorizes the incoming special packet,
defines the action set to be applied in accordance to the packet content, the switch policy, and the stored flow records,
retrieves the stored action set or execute delivery instructions from the packet in order to produce the required action set,
executes action set on the packet in accordance to the network policy;
a controller-side interface of OpenFlow channel to support the interaction between the processor and the OpenFlow switch in the engine mode of operation,
wherein the interface:
receives the special packet, that might be encapsulated in the OpenFlow message (e.g. OpenFlow packetIn), from the OpenFlow switch and redirects the special packet, extracted from the message, to the processor for further processing,
receives the special packet from the processor, encapsulates (if necessary) the special packet in the OpenFlow message (e.g. OpenFlow packetOut), and sends the special packet to the OpenFlow switch,
receives the request to modify the state of the OpenFlow switch from the processor and sends the OpenFlow message (e.g. OpenFlow flowMod) to the OpenFlow switch,
receives the OpenFlow message (e.g. OpenFlow flowRemoved) on the flow record removal from the OpenFlow switch and sends the notification to the processor,
supports exchange information about latency, bandwidth, liveness, change of port status, statistics between the OpenFlow switch and the engine;
a component for the packet relay—which is the part of the switch data plane (in the switch mode of operation),
wherein the component:
receives the special packet,
temporarily stores the special packet e.g. in pipeline or shared memory,
invokes the packet processing function,
provides access to the stored packet for write/read operations during the processing,
transmits or discards the packet as the part of the action set execution;
a component for packet relay—which is the part of another network appliance e.g. OpenFlow switch (in the engine mode of operation),
wherein the component:
receives the special packet on a switch port (or the OpenFlow channel interface with the engine),
parses and validates the special packet,
matches the special packet to flow in flow tables,
applies sets of actions to the special that it matches,
either discards or modifies-transmits the packet through a switch port (or the OpenFlow channel interface with the engine) as a part of the action set execution;
a component for control data management (i.e. a supervisor),
wherein the component:
controls the state of the switch and its links,
maintains ingress, execution, and policy,
supports exchange information with the controller,
performs standard OAM functions.

4. A controller for network virtual service deployment, management, and operations, the controller comprising functional entities:
a network resources, services, and users database(s),
wherein the component stores and provides access for the other components of the controller to information regarding—
network resources: network nodes and links, current network usage on flow level, administrative and operational statuses of the nodes and links,
network services: service templates and topic instances (incl. policy settings), current network usage on communication endpoint level, administrative and operational statuses of the templates and topic instances,
network users: domains and users accounts, current network usage on user level, administrative and operational statuses of the domains and users accounts;
an administrative web interface,
wherein the component is used for accessing platform management functions by administrators;
an identity service component,
wherein the component is used for—
managing domains and network users (incl. administrators),
authentication and high-level authorization of network users;
a service support module,
wherein the component is used for—
managing network virtual service templates and topic instances,
providing communication endpoint configuration to hosts,
providing any additional service-related settings (e.g. path) to hosts;
a network control module,
wherein the component is used for—
managing network resources (e.g. nodes and links) if necessary,
registering nodes (i.e. hosts and switches) and links (each link is the pair of the connections) between them for participating in self-driving content distribution,
updating usage policies on network switches.

What is claimed is:

1. A self-driving content distribution platform in a network comprising a network controller, a network host, and a network switch for network service development, management, and operations, that utilizes content delivery instructions within special packets;
wherein the network host produces and consumes the special packets, and the network host further comprises:

a. a physical or virtualized hardware for receiving and transmitting the special packets to and from the network as well as providing computational resources;
b. a computational environment for applications, the computational environment selected from a group comprising a container, operating system of virtual machine or physical server, or any other environment that is capable to run applications and can provide access to level 2/3 sockets,
wherein the computational environment is adapted to functioning in self-driving content distribution environment,
wherein an agent facilitates interactions between applications and network, the agent providing new communication endpoint capabilities to applications on an upper level and, at the same time, utilizes a standard level 2/3 networking capabilities of computational environment on a lower level;
wherein the network switch performs actions on the special packets coming from host communication endpoints or other network switches, the network switch:
implemented as a standalone appliance comprising both instruction execution and packet relay functional entities or the instruction execution functional entity may be implemented as a component by itself and integrated with an existing OpenFlow switch which provides packet relay functions;
the network switch further comprising the functional entities of:
a. a processor for execution of content delivery instructions wherein the processor:
parses and authorizes an incoming special packet,
defines whether any of stored action sets can be applied to the special packet based on the special packet content, a switch policy, and stored flow records,
retrieves a stored action set or executes delivery instructions from the special packet in order to produce a required action set,
applies the required action set to the special packet in accordance to the switch policy;
b. a controller-side interface of an OpenFlow channel to support an interaction between the processor and the OpenFlow switch,
wherein the interface:
receives the special packet, that might be encapsulated in an OpenFlow message comprising an OpenFlow packetIn, from the OpenFlow switch and redirects the special packet, extracted from the OpenFlow message, to the processor for further processing,
receives the special packet from the processor, encapsulates the special packet in the OpenFlow message comprising an OpenFlow packetOut, and sends the special packet to the OpenFlow switch,
receives a request to modify a state of the OpenFlow switch from the processor and sends the OpenFlow message comprising an OpenFlow flowMod to the OpenFlow switch,
receives the OpenFlow message comprising an OpenFlow flowRemoved on a flow record removal from the OpenFlow switch and sends a notification to the processor,
supports exchange of information about latency, bandwidth, liveness, change of port status, and statistics between the OpenFlow switch and the processor;
c. a component for packet relay, which is part of the network switch itself, wherein the component:
receives the special packet,
temporarily stores the special packet, e.g. in pipeline or shared memory,
invokes a packet processing function of the processor,
provides the processor with access to the stored special packet for write/read operations during the processing,
transmits or discards the special packet;
d. a component for packet relay, which is part of another network appliance comprising the OpenFlow switch,
wherein the component:
receives the special packet,
parses and validates the special packet in order to define whether to process the special packet locally by applying an action set already stored in flow tables or to send the special packet to the processor requesting a flow table update,
matches the special packet to a flow record in flow tables or sends the special packet to the processor,
applies the matching action set to the special packet,
either discards or modifies-transmits the special packet;
e. a component for control data management,
wherein the component:
controls the state of the switch and its links,
maintains switch ingress, execution, and egress policy,
supports exchange of information with the network controller,
performs standard operations, administration and maintenance functions.

2. A self-driving content distribution platform in a network comprising a network controller, a network host, and a network switch for network service development, management, and operations, that utilizes content delivery instructions within special packets;
wherein the network host produces and consumes special packets, and the network host further comprises:
a. a physical or virtualized hardware for receiving and transmitting the special packets to and from the network as well as providing computational resources;
b. a computational environment for applications, the computational environment selected from a group comprising a container, operating system of virtual machine or physical server, or any other environment that is capable to run applications and can provide access to level 2/3 sockets,
wherein the computational environment is adapted to functioning in self-driving content distribution environment,
wherein an agent facilitates interactions between applications and the network, the agent providing new communication endpoint capabilities to applications on an upper level and, at the same time, utilizes a standard level 2/3 networking capabilities of computational environment on a lower level;

wherein the network controller executes network service deployment, management, and operation functions using special packet specifications, the network controller:

provides administration of access controls to the specifications at flow, resource, service and user levels, maintains the special packet specifications, assists network hosts in setting up communication endpoints in accordance to the specifications, and authorizes network switches to establish links with hosts and other switches, i.e. network nodes, for special packets exchange;

the network controller further comprising functional entities of:
  a. a network resource, service, and user database,
  wherein the database stores and enables access for other components of the network controller to information regarding:
    network resources: network nodes and links, current network usage on flow level, administrative and operational statuses of the nodes and links,
    network services: service templates and topic instances with special packet specifications, current network usage on communication endpoint level, administrative and operational statuses of the templates and topic instances,
    network users: domains and users accounts, current network usage on user level, administrative and operational statuses of the domains and users accounts;
  b. an administrative web interface,
  wherein the interface enables access to platform management functions for administrators;
  c. an identity service component,
  wherein the service component enables:
    domain and network user management,
    authentication and high-level authorization of network users;
  d. a service support module,
  wherein the support module enables:
    management of network service templates and topic instances,
    configuration of host communication endpoints,
    additional host service-related setup;
  e. a network control module,
  wherein the control module enables:
    network resource management, comprising node and link management, if necessary,
    node and link registration, comprising registration of hosts and switches and links between them, nodes and links for participating in self-driving content distribution,
    switch usage policy updates.

* * * * *